US011508987B2

United States Patent
Harada et al.

(10) Patent No.: US 11,508,987 B2
(45) Date of Patent: Nov. 22, 2022

(54) NONAQUEOUS ELECTROLYTE SECONDARY BATTERY AND METHOD FOR PRODUCING SAME (71) Applicant: Panasonic Intellectual Property Management Co., Ltd., Osaka (JP)

(72) Inventors: Tomohiro Harada, Osaka (JP); Hiroshi Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 361 days.

(21) Appl. No.: 16/640,159

(22) PCT Filed: Oct. 10, 2018

(86) PCT No.: PCT/JP2018/037638
§ 371 (c)(1),
(2) Date: Feb. 19, 2020

(87) PCT Pub. No.: WO2019/087709
PCT Pub. Date: May 9, 2019

(65) Prior Publication Data
US 2021/0159536 A1 May 27, 2021

(30) Foreign Application Priority Data
Oct. 30, 2017 (JP) .............................. JP2017-209839

(51) Int. Cl.
*H01M 4/485* (2010.01)
*H01M 10/052* (2010.01)
(Continued)

(52) U.S. Cl.
CPC ....... *H01M 10/052* (2013.01); *H01M 4/0404* (2013.01); *H01M 4/382* (2013.01);
(Continued)

(58) Field of Classification Search
None
See application file for complete search history.

(56) References Cited

U.S. PATENT DOCUMENTS

| 2002/0081485 A1* | 6/2002 | Takekawa | H01M 10/0525 |
| | | | 429/231.1 |
| 2007/0166613 A1* | 7/2007 | Kogetsu | H01M 10/0585 |
| | | | 429/231.95 |

(Continued)

FOREIGN PATENT DOCUMENTS

| JP | 7-243957 A | 9/1995 |
| JP | 11-185818 A | 7/1999 |

(Continued)

OTHER PUBLICATIONS

English translation of JP 2001/243957 (Year: 2001).*
(Continued)

*Primary Examiner* — Yoshitoshi Takeuchi
(74) *Attorney, Agent, or Firm* — WHDA, LLP (57) ABSTRACT

The nonaqueous electrolyte secondary battery comprises the following: a positive electrode including a positive electrode active material that includes a lithium-containing transition metal oxide, a negative electrode including a negative electrode current collector wherein lithium metal deposits on the negative electrode current collector during charging, a separator disposed between the positive electrode and the negative electrode, and a nonaqueous electrolyte. The molar ratio of the total amount of lithium held by the positive electrode and the negative electrode to the amount of transition metal in the positive electrode is not more than 1.1. In addition, in the discharged state, a space layer is present between the negative electrode and the separator, and the positive electrode capacity per unit area, $\alpha$ (mAh/cm$^2$), of the positive electrode and the average in thickness, $X$ ($\mu$m), of the space layer 50 satisfy $0.05 \leq \alpha/X \leq 0.2$.

5 Claims, 2 Drawing Sheets (51) Int. Cl.
*H01M 4/04* (2006.01)
*H01M 4/38* (2006.01)
*H01M 4/66* (2006.01)
*H01M 10/0587* (2010.01)
*H01M 4/02* (2006.01)

(52) U.S. Cl.
CPC ........... *H01M 4/485* (2013.01); *H01M 4/661* (2013.01); *H01M 10/0587* (2013.01); *H01M 2004/021* (2013.01); *H01M 2300/0025* (2013.01)

(56) References Cited

U.S. PATENT DOCUMENTS

2012/0171536 A1* 7/2012 Kaneda ............. H01M 10/0525
    429/129

2017/0133660 A1    5/2017 Kurihara et al.
2018/0337394 A1   11/2018 Matsui et al.

FOREIGN PATENT DOCUMENTS

| JP | H 11185818 | * | 7/1999 | ............ H01M 10/40 |
| JP | 2001/243957 | * | 9/2001 | .............. H01M 4/64 |
| JP | 2001-243957 A | | 9/2001 | |
| JP | 2001243957 | * | 9/2001 | ............ H01M 10/05 |
| JP | 2018-195576 A | | 12/2018 | |
| WO | 2015/145288 A1 | | 10/2015 | |

OTHER PUBLICATIONS

The Extended European Search Report dated Jan. 11, 2021, issued in counterpart EP Application No. 18873064.2. (15 pages).
International Search Report dated Jan. 15, 2019, issued in Application No. PCT/JP2018/037638 (1 page).

* cited by examiner

NONAQUEOUS ELECTROLYTE SECONDARY BATTERY AND METHOD FOR PRODUCING SAME

TECHNICAL FIELD

The present disclosure relates to a non-aqueous electrolyte secondary battery and a method for manufacturing the same, and more specifically to a lithium secondary battery and a method for manufacturing the same.

BACKGROUND ART

A further increase in capacity of non-aqueous electrolyte secondary batteries has been required also in the field of equipment for vehicles, the field of the accumulation of electricity, and the like in addition to the ICT field of apparatuses such as personal computers and smart phones. As non-aqueous electrolyte secondary batteries with high capacity, lithium ion batteries have been used exclusively. Although a configuration in which, for example, a lithium-containing transition metal oxide is used for a positive electrode, and a negative electrode active material comprising graphite, a silicon compound and the like is used for an negative electrode is known as a lithium ion battery, this configuration is reaching the limit with respect to an increase in capacity.

Patent Literature 1 discloses a lithium battery in which a part of a positive electrode comprises a lithium transition metal oxide having an inverse spinel structure, and a negative electrode is selected from the group consisting of lithium metal, a lithium alloy and a lithium intercalation compound.

Patent Literature 2 discloses a rechargeable battery in which a part of a positive electrode comprises a specific lithium manganese oxide intercalation compound, a negative electrode comprises a lithium manganese oxide intercalation compound, and an electrolyte comprises a lithium salt dissolved in a non-aqueous solvent.

CITATION LIST

Patent Literature

PATENT LITERATURE 1: Japanese Unexamined Patent Application Publication No. Hei7-243957

SUMMARY

In a battery system using a lithium-containing transition metal oxide for a positive electrode and also using lithium metal for a negative electrode like a technique disclosed in Patent Literature 1, the amount of lithium metal in the system increased, the amount of lithium metal based on the amount of the transition metal in the system was however surplus, and it could not, therefore, be said that the capacity improvement effect was enough. There is a lithium secondary battery in which lithium metal is deposited on a negative electrode at the time of charge, and the lithium metal is dissolved in a non-aqueous electrolyte at the time of discharge as a non-aqueous electrolyte secondary battery which is promising with respect to an increase in capacity. However, there was a problem that in such a lithium secondary battery, stress occurred in the electrode by the expansion of the negative electrode due to the deposition of lithium metal and ununiform deposition of lithium metal on the surface of the negative electrode, and an electrode ruptured after all by repeated occurrence of stress in the electrode in every charge and discharge cycle.

Then, a non-aqueous electrolyte secondary battery which enables suppressing the rupture of an electrode which can occur when a charge and discharge cycle is repeated while achieving the increase in capacity of the battery has been required.

A non-aqueous electrolyte secondary battery which is one aspect of the present disclosure comprises: a positive electrode including a positive electrode active material comprising a lithium-containing transition metal oxide; a negative electrode, including a negative electrode current collector, wherein lithium metal deposits on the negative electrode current collector at the time of charge; a separator disposed between the positive electrode and the negative electrode; and a non-aqueous electrolyte, and is characterized in that a molar ratio of a total amount of lithium which the positive electrode and the negative electrode have to an amount of the transition metal included in the positive electrode is 1.1 or less, the battery has a space layer between the negative electrode and the separator in a discharge state, and a positive electrode capacity per unit area of the positive electrode, α (mAh/cm$^2$), and an average value of a thickness of the space layer, X (μm), satisfy $0.05 \leq \alpha/X \leq 0.2$.

A method for manufacturing a non-aqueous electrolyte secondary battery wherein the method is another aspect of the present disclosure is a method for manufacturing a non-aqueous electrolyte secondary battery comprising a positive electrode including a positive electrode active material comprising a lithium-containing transition metal oxide; a negative electrode, including a negative electrode current collector, wherein lithium metal deposits on the negative electrode current collector at the time of charge; a separator disposed between the positive electrode and the negative electrode; and a non-aqueous electrolyte, and is characterized by having: a step of coating a surface of the negative electrode current collector with ethylene carbonate to manufacture the negative electrode including a coating layer of ethylene carbonate on the surface; a step of layering and winding the negative electrode including a coating layer and the positive electrode through the separator to manufacture an electrode assembly; a step of housing the electrode assembly in a battery case; and a step of injecting the non-aqueous electrolyte containing a non-aqueous solvent other than ethylene carbonate into the battery case in which the electrode assembly is housed.

According to the present disclosure, a non-aqueous electrolyte secondary battery which enables suppressing the rupture of an electrode which can occur when a charge and discharge cycle is repeated while achieving the increase in capacity of the battery can be provided.

DESCRIPTION OF EMBODIMENTS

As mentioned above, the increase in capacity of a non-aqueous electrolyte secondary battery (lithium secondary battery) in which lithium metal deposits on an negative electrode at the time of charge, and the lithium metal dissolves in a non-aqueous electrolyte at the time of discharge can be expected, and the battery however has a problem that the electrode ruptures due to stress which occurs with the swelling due to lithium metal which deposits on the negative electrode. The present inventors have examined earnestly to solve such a problem and consequently found that, in an electrode assembly comprising a positive electrode, an negative electrode and a separator, a space which receives the swelling of the negative electrode due to the deposition of lithium metal at the time of charge is secured by forming a space layer between the negative electrode and the separator, and the rupture of the electrode after a charge and discharge cycle is repeated can be suppressed.

Figure 1:
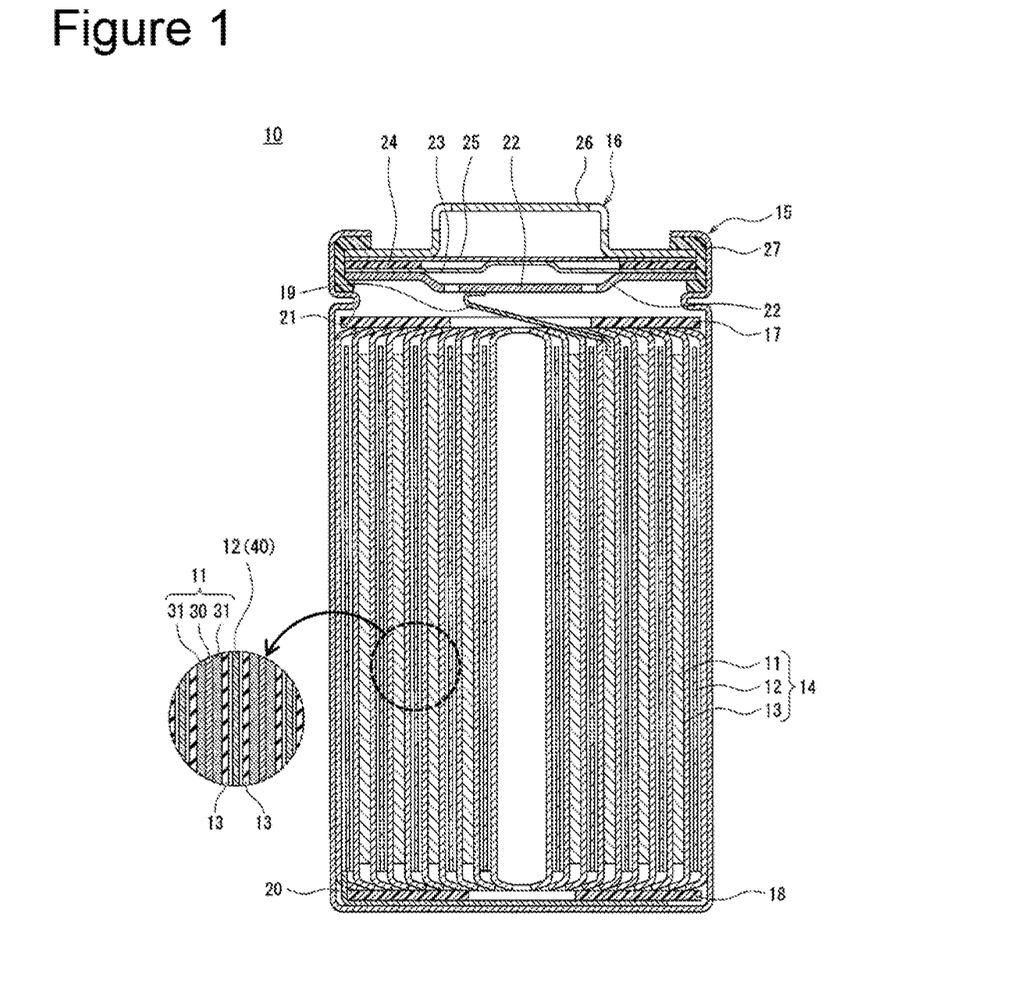
FIG. 1 is a longitudinal sectional view showing a non-aqueous electrolyte secondary battery which is an example of an embodiment.
Figure 2:
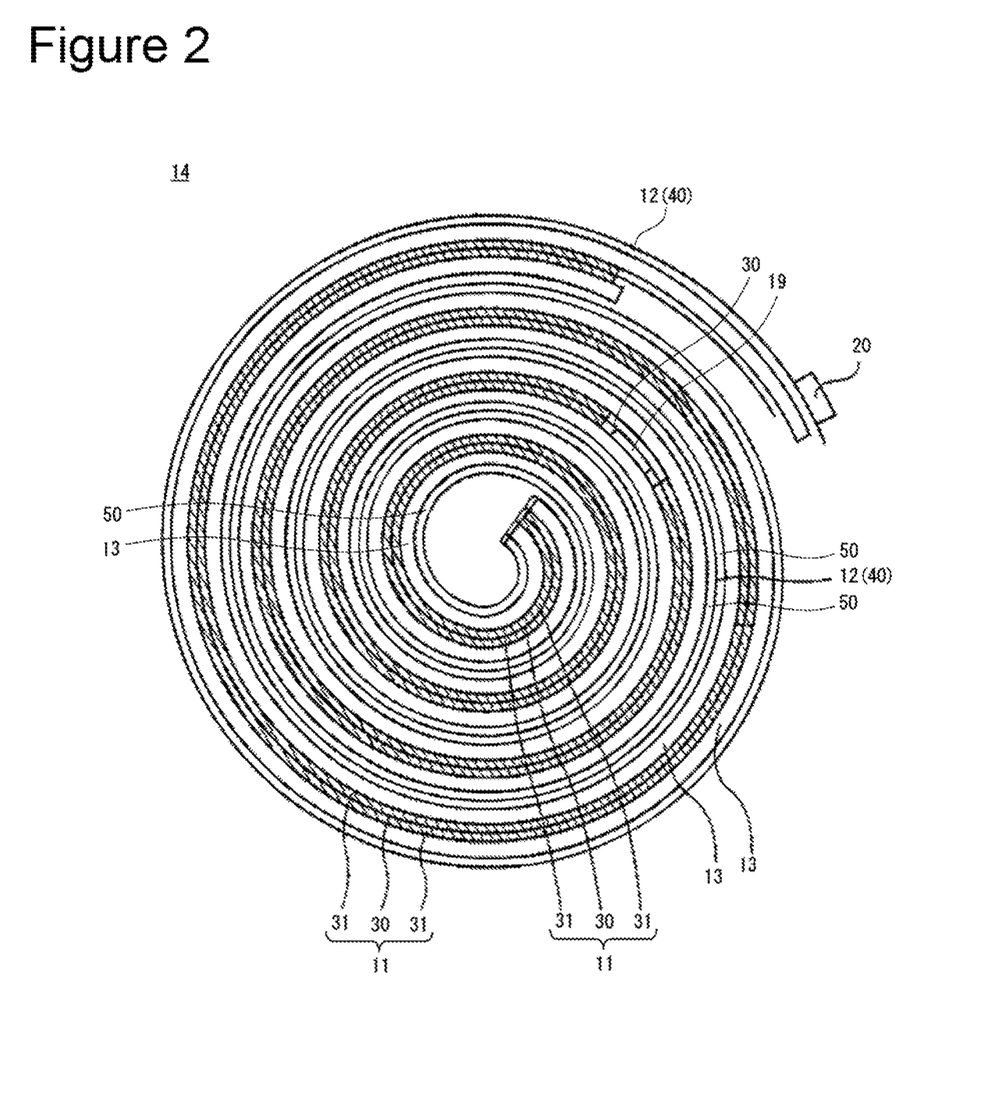
FIG. 2 is a partially transverse sectional view of an electrode assembly constituting a non-aqueous electrolyte secondary battery which is an example of an embodiment.

An example of an embodiment of a non-aqueous electrolyte secondary battery according to the present disclosure will be described in detail hereinafter. FIG. 1 is a longitudinal sectional view of a non-aqueous electrolyte secondary battery 10 which is an example of an embodiment, and shows a section including a direction along the winding axis of an electrode assembly 14. FIG. 2 is a transverse sectional view in a plane perpendicular to the winding axis of the electrode assembly 14 constituting the non-aqueous electrolyte secondary battery 10 which is an example of an embodiment, and schematically shows the disposition of a positive electrode 11, a negative electrode 12 and a separator 13 constituting the electrode assembly 14.

Although the non-aqueous electrolyte secondary battery 10 illustrated as an embodiment is a cylindrical battery comprising a cylindrical case made of metal, the non-aqueous electrolyte secondary battery of the present disclosure is not limited to this. The non-aqueous electrolyte secondary battery of the present disclosure may be, for example, a square battery comprising a square-shaped case made of metal, a laminated battery comprising an armor body comprising an aluminum laminate sheet, or the like. Although a wound electrode assembly 14 formed by winding the positive electrode and the negative electrode through the separator is illustrated as the electrode assembly constituting the non-aqueous electrolyte secondary battery, the electrode assembly is not limited to this. The electrode assembly may be, for example, a layered electrode assembly formed by layering a plurality of positive electrodes and a plurality of negative electrodes through separators by turns.

As illustrated in FIG. 1, the non-aqueous electrolyte secondary battery 10 comprises the electrode assembly 14 having a winding structure and a non-aqueous electrolyte (not shown). As shown in FIG. 1 and FIG. 2, the electrode assembly 14 comprises the positive electrode 11, the negative electrode 12 and the separator 13, and is formed by winding the positive electrode 11 and the negative electrode 12 through a separator 13 spirally. The non-aqueous electrolyte secondary battery 10 is a lithium secondary battery in which lithium metal deposits on the negative electrode 12 at the time of charge, and the lithium metal dissolves in the non-aqueous electrolyte at the time of discharge.

All of the positive electrode 11, the negative electrode 12 and the separator 13 constituting the electrode assembly 14 are formed in the shapes of belts, wound spirally, and layered by turns in the diameter direction of the electrode assembly 14 thereby. In the electrode assembly 14, the longitudinal direction of each electrode is the winding direction, and the cross direction of each electrode is the direction of the axis. A space layer 50 is formed between the negative electrode 12 and the separator 13 in the electrode assembly 14. The space layer 50 will be described in detail hereinafter.

A positive electrode lead 19 electrically connecting the positive electrode 11 and a positive electrode terminal is connected, for example, with the center in the longitudinal direction of the positive electrode 11, and extends from one end of the electrode assembly 14. A negative electrode lead 20 electrically connecting the negative electrode 12 and a negative electrode terminal is connected, for example, with an end in the longitudinal direction of the negative electrode 12, and extends from the other end of the electrode assembly 14. In the electrode assembly 14, when the negative electrode lead 20 connects with an end located outside in the diameter direction of the negative electrode 12, the negative electrode 12 lengthens in the winding direction at the time of the occurrence of stress in the negative electrode 12, and the range to which stress can be released is preferably widened.

In the example shown in FIG. 1, the battery case made of metal and housing the electrode assembly 14 and the non-aqueous electrolyte is constituted by a case body 15 and a sealing assembly 16. Insulating plates 17 and 18 are provided above and below the electrode assembly 14, respectively. The positive electrode lead 19 extends to the sealing assembly 16 side through a through hole of the insulating plate 17, and is welded to the lower surface of a filter 22 which is a bottom plate of the sealing assembly 16. In the non-aqueous electrolyte secondary battery 10, the cap 26 of the sealing assembly 16 electrically connected with the filter 22 functions as the positive electrode terminal. Meanwhile, the negative electrode lead 20 extends to the bottom side of the case body 15, and is welded to the inside of the bottom of the case body 15. In the non-aqueous electrolyte secondary battery 10, the case body 15 functions as the negative electrode terminal.

The case body 15 is a bottomed cylindrical container made of metal. A gasket 27 is provided between the case body 15 and the sealing assembly 16, and the sealability in the battery case is secured. The case body 15 has a projecting portion 21 which is formed, for example, by pressing a side portion from outside and supports the sealing assembly 16. The projecting portion 21 is preferably formed in a ring shape along the circumferential direction of the case body 15, and supports the sealing assembly 16 on its upper surface.

The sealing assembly 16 has a structure in which the filter 22, a lower vent member 23, an insulating member 24, an upper vent member 25 and the cap 26 are layered sequentially from the electrode assembly 14 side. Members constituting the sealing assembly 16 have, for example, disk shapes or ring shapes, and the members except the insulating member 24 are electrically connected with each other. The lower vent member 23 and the upper vent member 25 are connected with each other at the respective centers, and the insulating member 24 is between the respective peripheries. When the internal pressure of the battery increases by abnormal beat generation, the lower vent member 23 is provided with an air holes, and the upper vent member 25 therefore swells to the cap 26 side, and is separated from the lower vent member 23. The electrical connection between both is cut off thereby. When the internal pressure further increases, the upper vent member 25 ruptures and gas is discharged from an opening of the cap 26.

[Space Layer]

The space layer 50 which has a specific thickness between the negative electrode 12 and the separator 13 is formed in the electrode assembly 14 according to the present disclosure. When the negative electrode 12 not including the negative electrode mixture layer on the negative electrode current collector 40 is used in the lithium secondary battery, lithium ion dissolving in an electrolytic solution deposits on the surface of the negative electrode 12 as lithium metal at the time of charge, and the thickness of the whole negative electrode 12 increases according to the amount of lithium metal deposited (swelling). In the non-aqueous electrolyte secondary battery 10 of the present disclosure, the rupture of the positive electrode 11 and the negative electrode 12 (when the positive electrode 11 and the negative electrode 12 are not distinguished, both are generically named "electrodes" herein) which can occur by the swelling of the negative electrode 12 at the time of charge can be suppressed by forming the space layer 50. It is considered that the principle is as follows.

In a conventional lithium metal deposition secondary battery, electrodes and a separator are layered as densely as possible, and a space which only a non-aqueous electrolyte occupies is excluded in the case body 15 from the viewpoint of the capacity improvement. Meanwhile, as charge proceeds further in the deposition secondary battery, the amount of lithium metal deposited increases, and a negative electrode is swollen. Here, since lithium metal deposits ununiformly on the surface of the negative electrode at the time of charge, local distortion occurs in the layered structure of the electrodes and the separator, and stress occurs in the electrodes, combined with the swelling of the negative electrode. Since the electrodes and the separator are densely layered in the conventional deposited secondary battery as mentioned above, stress which occurs in the electrodes is not released. It is considered that thus, stress occurs in the electrodes in every charge and discharge cycle, fatigue accumulates in the electrodes by repeating it, and the electrodes rupture after all.

Meanwhile, in the non-aqueous electrolyte secondary battery 10 of the present disclosure, the space layer 50 having a specific thickness is formed between the negative electrode 12 and the separator 13, namely adjacently to the negative electrode 12. Since the space which receives the swelling of the negative electrode 12 by the deposition of lithium metal at the time of charge is secured by this, the occurrence of stress in the polar plates can be suppressed. Even though local stress occurs by ununiform deposition of lithium metal, this can be relaxed by the space layer 50. Therefore, it is considered that even though a charge and discharge cycle is repeated in the non-aqueous electrolyte secondary battery 10, fatigue by the occurrence of stress is not accumulated in the electrodes, and the rupture of the electrodes resulting from the deposition of lithium at the time of charge can be suppressed consequently.

It can be said that the formation of the space layer 50 in the lithium secondary battery is disadvantageous with respect to the capacity improvement of the battery. However, in the non-aqueous electrolyte secondary battery 10 of the present disclosure, a space in which the negative electrode mixture layer is not provided can be used for expanding the areas of the positive electrode 11 and the negative electrode 12 per battery and increasing the content of a lithium-containing transition metal oxide which is a positive electrode active material per battery as compared with a conventional lithium secondary battery in which negative electrode mixture layers are provided on both sides of the negative electrode current collector. Therefore, the total amount of the positive electrode capacity per battery increases beyond a capacity decrease by forming the space layer 50, and the increase in capacity of the battery can be achieved.

According to one aspect of the present disclosure, the space layer 50 are formed so that the positive electrode capacity per unit area of the positive electrode 11 $\alpha$(mAh/cm$^2$) and the thickness of the space layer 50 X (μm) satisfy $0.05 \leq \alpha/X \leq 0.2$ when the non-aqueous electrolyte secondary battery 10 is in a discharge state. Here, the positive electrode capacity per unit area of the positive electrode 11 $\alpha$ at the time of the discharge of the non-aqueous electrolyte secondary battery 10 is a value obtained by dividing the positive electrode capacity per battery $\Sigma\alpha$ (mAh) by the total area of a positive electrode mixture layer 31 formed on the surface of a positive electrode current collector 30 (cm$^2$). The positive electrode capacity per battery $\Sigma\alpha$ is calculated, for example, by the product of the theoretical capacity of lithium metal (3860 mAh/g) by and the total mass of lithium included in the positive electrode 11, more specifically the positive electrode mixture layer 31. The total mass of lithium included in the positive electrode mixture layer 31 may be calculated, for example, based on the composition and the thickness of the positive electrode mixture layer 31, and the total area of the wound positive electrode mixture layer 31. Meanwhile, the thickness of the space layer 50 X is the average value of the thickness in the layering direction of the space layer 50 provided between the negative electrode 12 and the separator 13. In other words, the thickness X is an average value of the distance between the surface of the negative electrode 12 opposite to the separator 13 and the surface of the separator 13 opposite to the negative electrode 12. For example, when the positive electrode capacity per unit area of the positive electrode 11 $\alpha$ is 5.4 mAh/cm$^2$, the thickness of the space layer 50 X is 28 μm or more and 112 μm or less.

It can also be said that the ratio of the positive electrode capacity per unit area of the positive electrode 11 $\alpha$ to the thickness of the space layer 50 X expresses the relationship between the amount of lithium metal deposited on the negative electrode 12 at the time of charge and a volume occupying the space layer 50. When the ratio $\alpha/X$ is too high, the space which receives the swelling of the negative electrode by the deposition of lithium metal cannot be secured, and the effect of preventing electrode rupture is not fully obtained. When the ratio $\alpha/X$ is too low, the positive electrode capacity per battery $\Sigma\alpha$ decreases, and the importance of using a lithium metal deposition secondary battery is deteriorated. The positive electrode capacity per unit area of the positive electrode 11 $\alpha$ and the thickness of the space layer 50 X preferably satisfy $0.05 \leq \alpha/X \leq 0.2$, and more preferably satisfy $0.07 \leq \alpha/X \leq 0.15$ from the above-mentioned viewpoint.

The thickness of the space layer 50 X and the total area, the thickness and the like of the positive electrode mixture layer 31 in the non-aqueous electrolyte secondary battery 10 may be measured, for example, using an X-ray CT apparatus (for example, "Microfocus X-Ray Fluoroscopy System SMX-2000" manufactured by SHIMADZU CORPORATION), the positive electrode capacity per unit area of the positive electrode 11 $\alpha$ is calculated by dividing the product of the theoretical capacity (3860 mAh/g) of lithium metal by the total mass of the lithium included in the positive electrode mixture layer 31 by the total area of the positive electrode mixture layer 31 (cm$^2$) as above-mentioned. The total mass of lithium included in the positive electrode mixture layer 31 is calculated, for example, based on the composition, the thickness and the total area of the positive electrode mixture layer 31. The composition of the lithium-containing transition metal oxide included in the positive electrode mixture layer 31 is subjected to qualitative and quantitative analyses using a well-known analysis apparatus such as an ICP emission spectrophotometer (for example, "CIROS-120" manufactured by Spectro Analytical Instruments GmbH). The thickness of the space layer 50 X is a value measured at the time of the initial stage of cycles, and is measured, for example, using a battery in 10 cycles or less.

[Method for Forming Space Layer]

As long as the space wherein the thickness average is included in the above-mentioned range can be formed between the negative electrode 12 and the separator 13, a specific method for forming the space layer 50 is not limited.

According to one aspect of the present disclosure, a method for manufacturing the non-aqueous electrolyte secondary battery 10 having the space layer 50 has: a step of coating the surface of the negative electrode current collector 40 with ethylene carbonate (EC) to manufacture the negative electrode 12 including an EC coating layer on the surface (a negative electrode manufacturing step); a step of layering the negative electrode 12 including the EC coating layer and the positive electrode 11 through the separator 13 and winding these to manufacture the electrode assembly 14 (an electrode assembly manufacturing step); a step of housing the electrode assembly 14 in the case body 15; and a step of injecting the non-aqueous electrolyte containing a non-aqueous solvent other than EC into the case body 15 in which the electrode assembly 14 is housed.

Ethylene carbonate (EC) is a non-aqueous solvent used as a non-aqueous electrolyte of lithium secondary batteries, and has a melting point of 34° C. to 37° C. Therefore, although EC is a solid at room temperature (25° C.), EC easily dissolves in another non-aqueous solvent used similarly as the non-aqueous electrolyte, and becomes a mixed solvent which is a liquid at room temperature. In the present aspect, the non-aqueous electrolyte secondary battery 10 having the space layer 50 is manufactured using this property of EC. That is, in the negative electrode manufacturing step, liquid EC obtained by heating to the melting point or more is applied to the surface of the negative electrode current collector 40 to form an EC coating layer. The EC coating layer soon solidifies due to a decrease in temperature. In the electrode assembly manufacturing step, the electrode assembly 14 provided with the separator 13 on the positive electrode 11 side and with the EC coating layer on the negative electrode 12 side between the positive electrode 11 and the negative electrode 12 is subsequently manufactured by layering and winding the negative electrode 12 including the solidified EC coating layers on both surfaces and the positive electrode 11 through the separator 13. The obtained electrode assembly 14 is housed in the case body 15, the non-aqueous electrolyte containing a non-aqueous solvent other than EC is then injected into the case body 15. The EC coating layers is dissolved by the non-aqueous electrolyte injected into the case body 15, spaces in which the EC coating layers were provided is filled with the non-aqueous electrolyte to form space layers 50.

Since conventionally well-known EC is used as the non-aqueous electrolyte of a lithium secondary battery, the method for manufacturing a non-aqueous electrolyte secondary battery 10 having the negative electrode manufacturing step of forming an EC coating layer on the surface of the above-mentioned negative electrode 12 is also highly compatible with an electrode assembly 14 in which the configuration of a positive electrode active material and the like is different. Since all of the EC coating layer formed on the surface of the negative electrode 12 disappears in the initial state after the manufacturing of the battery, the surface layer of the negative electrode 12 can be utilized effectively, and the energy density of the non-aqueous electrolyte secondary battery 10 can be improved as compared with when a member for forming a space layer 50 is provided.

Although the above-mentioned description showed an example in which the EC coating layer is provided on the surface of the negative electrode current collector 40 as a method of forming a space layer 50 between the negative electrode 12 and the separator 13, the method of forming a space layer 50 is not limited to this. For example, a non-aqueous electrolyte secondary battery 10 including a space layer 50 may be manufactured in the same way as in the above-mentioned description except that the EC coating layer is not provided on the surface of the negative electrode current collector 40 but on the surface of the separator 13 opposite to the negative electrode 12. A coating layer comprising another non-aqueous solvent other than EC which is a solid at room temperature and can dissolve in a non-aqueous electrolyte may be provided on the surface of the negative electrode current collector 40 or the surface of the separator 13 opposite to the negative electrode 12. A resin or the like which dissolves in a non-aqueous electrolyte electrolytic solution may be provided on the surface of the negative electrode current collector, and a space may be formed by dissolving the resin after the injection of the non-aqueous electrolyte electrolytic solution. The negative electrode 12 and the separator 13 may be separated in the electrode assembly 14 by disposing projection portions having a predetermined height at predetermined intervals on either or both of the surface of the negative electrode current collector 40 and the surface of the separator 13 opposite to the negative electrode 12, and a space layer 50 may be formed.

In the non-aqueous electrolyte secondary battery 10 of the present disclosure, the molar ratio of the total amount of lithium which the positive electrode 11 and the negative electrode 12 have to the amount of the transition metal included in the positive electrode 11 is 1.1 or less. When lithium and the transition metals included in the positive electrode and the negative electrode of the non-aqueous electrolyte secondary battery 10 exist excessively beyond the above-mentioned range, side reactions occur easily. For example, when the battery is stored in the state of discharge, gas is easily generated. When charge and discharge are repeated under a condition of overdischarge, gas is easily generated, and the capacity deteriorates markedly. The total amount (the total content) of lithium which the positive electrode 11 and the negative electrode 12 have is the total amount of lithium constituting the lithium-containing transition metal oxide included in the positive electrode mixture layer 31 of the positive electrode 11 as the positive electrode active material and lithium in the case the negative electrode current collector 40 of the negative electrode 12 has the lithium metal in the non-aqueous electrolyte secondary battery 10.

Components of the electrode assembly 14 (the positive electrode 11, the negative electrode 12 and the separator 13) and the non-aqueous electrolyte will be described in detail hereinafter.

[Positive Electrode]

The positive electrode 11 comprises the positive electrode current collector 30 and the positive electrode mixture layer 31 formed on the current collector. Foil of a metal such as aluminum which is stable in the potential range of the positive electrode 11, a film wherein the metal is disposed on the outer layer, or the like can be used for the positive electrode current collector 30. The positive electrode mixture layer 31 comprises the positive electrode active material, a conductive agent and a binding agent. Positive electrode mixture layers 31 are generally formed on both surfaces of the positive electrode current collector 30. The positive electrode 11 can be manufactured, for example by applying positive electrode mixture slurry including the positive electrode active material, the conductive agent, the binding agent and the like to the positive electrode current collector 30, drying the coating films, and then rolling the coating films to form positive electrode mixture layers 31 on both surfaces of the current collector.

The positive electrode active material included in the positive electrode mixture layer 31 comprises a lithium-containing transition metal oxide. A metallic element other than lithium constituting a lithium-containing transition metal oxide is, for example, at least one selected from magnesium (Mg), aluminum (Al), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), tin (Sn), antimony (Sb), tungsten (W), lead (Pb) and bismuth (Bi). In the present disclosure, these metallic elements other than lithium constituting the lithium-containing transition metal oxide are considered as "transition metals constituting the lithium-containing transition metal oxide" for convenience. The lithium-containing transition metal oxide included in the positive electrode mixture layer 31 preferably includes at least one selected from Co, Ni, Mn, and Al as the transition metals. The molar ratio of lithium to the transition metal constituting the lithium-containing transition metal is 1.1:1 or less.

The lithium-containing transition metal oxide included in the positive electrode mixture layer 31 preferably has a crystal structure belonging to the space group R-3m. The crystal structure belonging to the space group R-3m is a structure formed by layering lithium-oxygen octahedral layers and transition metal-oxygen octahedral layers, and is a crystal structure which, for example, lithium nickelate ($LiNiO_2$) and lithium cobaltate ($LiCoO_2$) have. It is because when the positive electrode active material has a crystal structure belonging to the space group R-3m, a high charge and discharge capacity is obtained in the secondary battery. It can be confirmed that the positive electrode active material has a crystal structure belonging to the space group R-3m, for example, by performing analysis based on a powder X-ray diffractometry as to the positive electrode active material and obtaining an X-ray diffraction pattern.

Examples of the conductive agent constituting the positive electrode mixture layer 31 include carbon materials such as carbon black (CB), acetylene black (AB), ketjen black and graphite. Examples of the binding agent constituting the positive electrode mixture layer 31 include fluorine-containing resins such as polytetrafluoroethylene (PTFE) and polyvinylidene fluoride (PVdF); polyacrylonitrile (PAN); polyimide-based resins; acrylic-based resins and polyolefin-based resin. These may be used alone or in combination of two or more.

[Negative Electrode]

The negative electrode 12 is an electrode on which lithium metal is deposited at the time of charge, and has the negative electrode current collector 40. Lithium metal which deposits on the negative electrode 12 by charge is derived from lithium ions in the non-aqueous electrolyte, and the depositing lithium metal dissolves in the electrolytic solution by discharge.

The negative electrode current collector 40 comprises metallic foil such as copper, nickel, iron and stainless alloy (SUS), and copper foil with high conductivity is particularly preferable. The copper foil is metallic foil including copper as the main component, and may comprise only copper substantially. The thickness of the copper foil is preferably 5 μm or more and 20 μm or less. The negative electrode 12 comprises only copper foil having a thickness of 5 μm or more and 20 μm or less, for example, before the charge and discharge of the battery. Lithium metal deposits on both surfaces of the copper foil by charge to form lithium metal layers. The negative electrode current collector 40 may contain a lithium metal layer. For example, the lithium metal layer may be lithium metal foil, or may be an article wherein a lithium metal layer is formed on the surface by vapor deposition or the like (in this case, the lithium functions as an active material). The negative electrode current collector 40 does not preferably have a negative electrode active material in the initial state.

The negative electrode 12 preferably comprises only the negative electrode current collector 40 in the initial state. The volume energy density of the battery can be increased thereby. When a current collector or the like including lithium metal foil or a lithium metal layer is used as the negative electrode current collector 40, the volume energy density of the battery decreases by the thickness of the lithium layer.

When an EC coating film is formed on the surface of the negative electrode current collector 40 to manufacture a non-aqueous electrolyte secondary battery 10, the surface of the negative electrode current collector 40 after the EC coating film dissolves in the non-aqueous electrolyte has a specific surface roughness in many cases. In the non-aqueous electrolyte secondary battery 10 according to one aspect of the present disclosure, the arithmetic average roughness Ra of the surface of the negative electrode current collector 40 is, for example, 1.0 μm or more and 10.0 μm or less. It is considered that when the EC coating film solidifies, the thickness of the EC coating film becomes uneven, then the pattern of the solidified EC coating film is transferred to the negative electrode current collector 40 by winding the negative electrode 12 including the EC coating film with the positive electrode 11 and the separator 13 to form the surface roughness formed in the surface of the negative electrode current collector 40. The arithmetic average roughness Ra is a value calculated based on JIS B0601: 2001, and is calculated by averaging the absolute value of the roughness curve per standard length as to any portion of the surface of the negative electrode current collector 40 using a well-known method, for example, a shape measuring laser microscope apparatus ("VK-X200" manufactured by KEYENCE CORPORATION).

The negative electrode current collector 40 may have a layer including a solid electrolyte, organic matter and inorganic matter (protective layer) on the surface. The protective layer has the effect of uniforming an electrode surface reaction, lithium metal uniformly deposits on the negative electrode, and the swelling of the negative electrode 12 can be suppressed. Examples of a solid electrolyte include sulfide-based solid electrolytes, phosphate-based solid electrolytes, perovskite-based solid electrolytes and garnet-based solid electrolytes.

As long as the above-mentioned sulfide-based solid electrolytes contain a sulfur component and have lithium ion conductivity, the sulfide-based solid electrolytes are not particularly limited. Specific examples of raw materials of the sulfide-based solid electrolytes include a raw material including Li, S and the third component A. Examples of the third component A include at least one selected from the group consisting of P, Ge, B, Si, I, Al, Ga and As. Specific examples of the sulfide-based solid electrolytes include $Li_2S$—$P_2S_5$, $70Li_2S$-$30P_2S_5$, $80Li_2S$-$20P_2S_5$, $Li_2S$—$SiS_2$ and $LiGe_{0.25}P_{0.75}S_4$.

As long as the above-mentioned phosphate-based solid electrolytes contain a phosphate component and have lithium ion conductivity, the phosphate-based solid electrolytes are not particularly limited. Examples of the phosphate-based solid electrolytes include $Li_{1+n}Al_nTi_{2-n}(PO_4)_3$ (0<n<2, particularly preferably 0<n≤1), such as $Li_{1.5}Al_{1.5}Ti_{1.5}(PO_4)_3$; and $Li_{1+n}Al_nGe_{2-n}(PO_4)_3$ (0<n<2, particularly preferably 0<n≤1).

As the above-mentioned organic matter layer, lithium conductive substances such as polyethylene oxide and polymethyl methacrylate are preferable. As the inorganic matter layer, ceramic materials such as $SiO_2$, $Al_2O_3$ and MgO are preferable.

[Separator]

A porous sheet having ion permeability and insulation properties is used for the separator 13. Examples of the porous sheet include fine porous thin films, woven fabrics and nonwoven fabrics. As the material of the separator 13, olefin-based resins such as polyethylene, polypropylene and a copolymer including at least either of ethylene and propylene; cellulose; and the like are preferable. The separator 13 may be a layered body including a cellulose fiber layer and a thermoplastic resin fiber layer such as an olefin-based resin. The separator 13 may be a multilayer separator including a polyethylene layer and a polypropylene layer, and the separator 13 wherein an aramid-based resin or the like were applied to the surface of the separator 13 may be used. A heat-resistant layer including a filler of an inorganic compound may be formed on the interface between the separator 13 and at least either of the positive electrode 11 and the negative electrode 12.

[Non-Aqueous Electrolyte]

The non-aqueous electrolyte includes a non-aqueous solvent and an electrolyte salt dissolving in the non-aqueous solvent. For example, esters ethers; nitriles such as acetonitrile; amides such as dimethylformamide; mixed solvents of two or more of these; and the like can be used for the non-aqueous solvent. The non-aqueous solvent may contain halogen substitution products in which at least some of the hydrogen atoms of these solvents are replaced with halogen atoms such as fluorine atoms. The non-aqueous electrolyte is not limited to a liquid electrolyte (non-aqueous electrolytic solution), and may be a solid electrolyte using a gel polymer or the like.

As mentioned above, when the space layer 50 which is adjacent to the negative electrode 12 is provided by providing a coating layer of ethylene carbonate (EC) on the surface of the negative electrode current collector 40, the non-aqueous electrolyte secondary battery 10 includes ethylene carbonate (EC) and a non-aqueous solvent other than EC as the non-aqueous electrolyte. Examples of the non-aqueous solvent other than EC include esters other than EC; ethers; nitriles such as acetonitrile; amides such as dimethylformamide; mixed solvents of two or more of these. When the space layer 50 is provided by an above-mentioned method, the total of EC existing on the surface of the negative electrode current collector 40 as the coating layer and the non-aqueous electrolyte added to the case body 15 after the electrode assembly 14 is housed in the case body 15 is a non-aqueous electrolyte contained in the non-aqueous electrolyte secondary battery 10 in the initial state. Therefore, the composition of the non-aqueous solvent, the content of the electrolyte salt in the non-aqueous electrolyte added in the case body 15, and the like may be determined in view of the EC coating layer on the surface of the negative electrode current collector 40.

Examples of the above-mentioned esters include cyclic carbonic esters such as propylene carbonate (PC), butylene carbonate and fluoroethylene carbonate (FEC) besides ethylene carbonate (EC); chain-like carbonic esters such as dimethyl carbonate (DMC), ethyl methyl carbonate (EMC), diethyl carbonate (DEC), methyl propyl carbonate, ethyl propyl carbonate and methyl isopropyl carbonate; cyclic carboxylate esters such as γ-butyrolactone and γ-valerolactone; and chain-like carboxylate esters such as methyl acetate, ethyl acetate, propyl acetate, methyl propionate (MP), ethyl propionate, γ-butyrolactone and fluoromethyl propionate (FMP).

Examples of the above-mentioned ether include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers; and chain-like ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the electrolyte salt included in the non-aqueous electrolyte include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, and imide salts such as $LiN(SO_2CF_3)$, $LiN(C_lF_{2l+1}SO_2)(C_mF_{2m+1}SO_2)$ {l and m are integers of 1 or more}. $LiPF_6$ is preferably used particularly.

As the method for coating the surface of the negative electrode current collector 40 with ethylene carbonate (EC), well-known methods such as roll coating, bar coating, gravure coating, gravure reverse coating, die coating, slide coating and curtain coating can be used.

The non-aqueous electrolyte preferably includes an additive decomposed on the negative electrode 12. The non-aqueous electrolyte includes at least one selected, for example, from vinylene carbonate (VC), fluoroethylene carbonate (FEC) and vinyl ethyl carbonate (VEC). The swelling of a negative electrode is further suppressed by adding VC and the like, and the cycle characteristics become better.

EXAMPLES

Although the present disclosure will be further described in detail hereinafter by the Examples, the present disclosure is not limited to these Examples.

Example 1

[Manufacturing of Positive Electrode]

A lithium-containing transition metal oxide containing aluminum, nickel and cobalt as a positive electrode active material; acetylene black (AB) and polyvinylidene fluoride (PVdF) were mixed at a mass ratio of 95:2.5:2.5, a suitable amount of N-methyl-2-pyrrolidone (NMP) was further added, and the mixture was stirred to prepare positive electrode mixture slurry. Next, the positive electrode mixture slurry was applied to both surfaces of a positive electrode current collector comprising aluminum foil, and the coating films were dried. The coating films were rolled using a roller, and the electrode was then cut to a predetermined electrode size to manufacture a positive electrode in which the positive electrode mixture layers were formed on both sides of the positive electrode current collector sequentially. The molar ratio of lithium to the total of the transition metals in the lithium-containing transition metal oxide used as the positive electrode active material was 1.0.

[Manufacturing of Negative Electrode]

Electrolytic copper foil (10 μm in thickness) was cut to a predetermined electrode size to form a negative electrode current collector. Ethylene carbonate (EC) liquified by heating at 60° C. was applied to both sides of the negative electrode current collector. The film thickness of EC applied to one surface was 40 μm. A negative electrode mixture other than EC, or the like was not applied to the copper foil.

[Preparation of Non-Aqueous Electrolytic Solution]

EC and dimethyl carbonate (DMC) were mixed to prepare a mixed solvent.

Subsequently, $LiPF_6$ and $LiBF_2(C_2O_4)$ were dissolved in the mixed solvent to prepare a non-aqueous electrolytic solution. The mixture ratio of EC to DMC in the mixed solvent was adjusted so that the volume ratio of the content of EC after EC constituting the coating films formed on the surfaces of the negative electrode dissolved in the mixed solvent to the content of DMC was 3:7. Also as to the amount of $LiPF_6$ and $LiBF_2(C_2O_4)$ added to the mixed solvent, $LiPF_6$ and $LiBF_2(C_2O_4)$ were similarly added in amounts wherein the concentrations of $LiPF_6$ and $LiBF_2(C_2O_4)$ after EC constituting the coating films dissolves in the mixed solvent were 1.0 M (mol/L) and 0.1 M (mol/L), respectively.

[Manufacturing of Battery]

In an inert gas atmosphere, the above-mentioned positive electrode to which a tab made of aluminum was attached and the above-mentioned negative electrode to which a tab made of nickel was attached were wound spirally through a separator made of polyethylene to manufacture an electrode assembly. A space including the axis center of the winding axis and extending in the direction of the winding axis was formed in the electrode assembly of Example 1. The electrode assembly was housed in the armor body comprising an aluminum laminate, the above-mentioned non-aqueous electrolytic solution was injected, and the opening of an armor body was then sealed to manufacture a cylindrical battery T1. The positive electrode capacity per area of the positive electrode constituting the battery T1 α was 5.4 mAh/cm². The molar ratio of the total amount of lithium included in the battery T1 to the amount of the transition metals included in the positive electrode was 1.0.

Example 2

A cylindrical battery T2 was manufactured in the same way as Example 1 except that the film thickness per one surface of EC applied to both surfaces of the negative electrode current collector was changed into 75 μm in the manufacturing of the battery.

Comparative Examples 1 to 3

Cylindrical batteries T3 to T5 were manufactured in the same way as in Example 1 except that the film thicknesses per one surface of EC applied to both surfaces of the negative electrode current collectors were changed into 0.0 μm (without applying EC), 15 μm and 120 μm, respectively in the manufacturing of the batteries.

Reference Example

A battery T6 for reference was manufactured for comparing discharge capacities. The battery T6 for reference comprises a negative electrode including negative electrode mixture layers on both sides of copper foil. Negative electrode mixture slurry containing graphite as an negative electrode active material and a binding agent (styrene-butadiene rubber) at a mass ratio of 97.5:2.5 was applied to both sides of the copper foil which is an negative electrode current collector, the coating films were dried, and the coating films were then rolled with a rolling roller to prepare the negative electrode. The battery T6 for reference having a positive electrode capacity Σα of 3500 mAh was manufactured in the same way as in Example 1 except that the negative electrode including the negative electrode mixture layers obtained by the above-mentioned method was used as an negative electrode, and the lengths of a belt-shaped positive electrode, belt-shaped negative electrode and belt-shaped separator were adjusted so that almost no space was formed at the center.

[Evaluation Test]

A charge and discharge cycle test was performed as to each of the batteries of the Examples and the Comparative Examples. Under a battery temperature condition of 25° C., the battery was subjected to constant current charge at a current of 0.1 It until the voltage value was 4.3 V, and the battery was then subjected to constant voltage charge at a constant voltage of 4.3V until the current value was 0.01 It using each battery. Then, the battery was subjected to constant current discharge at a current of 0.1 It until the voltage value was 2.5V, and the discharge capacity when the battery was subjected to this constant current discharge was defined as the initial discharge capacity of each battery.

As to each battery, a charge and discharge cycle comprising constant current charge to 4.3 V at a current of 0.1 It, an idle period of 15 minutes, constant current discharge to 2.5 V at a current of 0.1 It, and an idle period of 15 minutes was next repeated 5 times under a temperature condition of 60° C. Then, each battery was taken out when the voltage value was 3.5 V or more and 3.6 V or less in the discharge state. As to each battery taken out, the average thickness X of the space layer 50 was measured using an X-ray CT apparatus (for example, "Microfocus X-Ray Fluoroscopy System SMX-2000" manufactured by SHIMADZU CORPORATION). "The positive electrode capacity per unit area α (mAh/cm²)/the thickness of the space layer X (μm)" was calculated from the obtained measurement result. As to each battery, the positive electrode capacity per unit area, α, is a theoretical value calculated based on the theoretical capacity of Li metal (3860 mAh/g), the composition and the layer thickness of the positive electrode mixture layer, and the area of the surfaces of the positive electrode current collector on which the positive electrode mixture layers were formed. Table 1 shows the calculation results.

Then, a charge and discharge cycle test in which the above-mentioned charge and discharge cycle was repeated 1500 times was performed to evaluate the electrode rupture suppressing performance of each battery. When 1500 charge and discharge cycles were completed at the voltage value and current value which were prescribed above as to each battery, it was determined that an electrode was not ruptured, and the electrode rupture suppressing performance of the battery was rated as "good". Meanwhile, when the prescribed voltage value or current value was not obtained in the charge and discharge cycle test while 1500 charge and discharge cycles were performed, it was determined that an electrode ruptured, and the electrode rupture suppressing performance of the battery was rated as "poor". When it was confirmed by observing a section of the electrode assembly as to each battery using the above-mentioned X-ray CT apparatus whether an electrode ruptured, the rupture of electrodes was not observed in batteries wherein the electrode rupture suppressing performance was rated as "good", and the rapture of electrodes was observed in batteries wherein the electrode rupture suppressing performance was rated as "poor". Table 1 shows the evaluation results.

The discharge capacity of each of the batteries of the Examples and the Comparative Examples was evaluated by comparing with the discharge capacity of the battery T6 for reference. The battery T6 is a conventional non-aqueous electrolyte secondary battery wherein the battery comprises a negative electrode including negative electrode mixture layers on both surfaces, and almost no space is formed between the negative electrode and the separator. As to each battery, a battery having the discharge capacity of the battery T6 or less was rated as "poor", and a battery having more discharge capacity than the battery T6 was rated as "good" based on the theoretical capacity of Li metal of each battery (3860 mAh/g), the composition and the layer thickness of a positive electrode mixture layer, and the value of the discharge capacity calculated based on an area in which positive electrode mixture layers were formed. The value of the initial discharge capacity measured by the above-mentioned test exactly agreed with the calculated value of the discharge capacity as to each battery. Table 1 shows the evaluation results of the discharge capacities of the batteries.

assembly 14 comprising the positive electrode 11, the negative electrode 12 and the separator 13 in the lithium deposition lithium secondary battery in which negative electrode mixture layers were not provided on the negative electrode current collector 40. Since the non-aqueous electrolyte secondary battery 10 according to the present disclosure is a lithium secondary battery in which lithium metal deposits on the surface of the negative electrode 12, the battery has the space layers 50 in which only the non-aqueous electrolyte is filled in the case body 15, the energy density per battery is however improved, and the increase in capacity of the battery is achieved as compared with a battery comprising a negative electrode in which negative electrode mixture layers are formed on the surfaces.

REFERENCE SIGNS LIST 10 non-aqueous electrolyte secondary battery,
11 positive electrode,
12 negative electrode,
13 separator,
14 electrode assembly,
15 case body (battery case),
16 sealing assembly,
17 and 18 insulating plates.
19 positive electrode lead,
20 negative electrode lead.
21 projecting portion,
22 filter,
23 lower vent member,
24 insulating member,
25 upper vent member,
26 cap,

TABLE 1

|  | Thickness of space layer, X (μm) | Positive electrode capacity α/thickness of space layer X ((mAh/cm²)/μm) | Evaluation of electrode rupture | Evaluation of discharge capacity |
| --- | --- | --- | --- | --- |
| Example 1 | 40 | 0.14 | Good | Good |
| Example 2 | 75 | 0.07 | Good | Good |
| Comparative Example 1 | 0 | — | Poor | The evaluation is impossible due to the rupture |
| Comparative Example 2 | 15 | 0.40 | Poor | The evaluation is impossible due to the rupture |
| Comparative Example 3 | 120 | 0.02 | Good | Poor |

As shown in Table 1, it was confirmed that in the batteries T3 and T4 of Comparative Examples 1 and 2, electrodes ruptured after the charge and discharge cycle test; in the battery T5 of Comparative Example 3, an increase in capacity could not be achieved; and meanwhile, in both of the batteries T1 and T2 of the Examples, the electrodes did not rupture after the charge and discharge cycle test, and an increase in capacity over the conventional battery T6 wherein the negative electrode mixture layers were provided on the negative electrode current collector was achieved. That is, it is considered that even after a charge and discharge cycle was repeated, the rupture of the electrode was suppressed by forming the space layers 50 having a specific thickness between the negative electrode 12 and the separator 13 and securing the spaces which receives the swelling of the negative electrode 12 due to the deposition of lithium metal at the time of charge in the electrode 27 gasket,
30 positive electrode current collector,
31 positive electrode mixture layer,
40 negative electrode current collector,
50 space layer

The invention claimed is:

1. A non-aqueous electrolyte secondary battery, comprising:
a positive electrode including a positive electrode active material comprising a lithium-containing transition metal oxide;
a negative electrode, including a negative electrode current collector, wherein lithium metal deposits on the negative electrode current collector at the time of charge;
a separator disposed between the positive electrode and the negative electrode; and a non-aqueous electrolyte, wherein
a molar ratio of a total amount of lithium which the positive electrode and the negative electrode have to an amount of the transition metal included in the positive electrode is 1.1 or less,
the battery has a space layer between the negative electrode and the separator in a discharge state, and a positive electrode capacity per unit area of the positive electrode, $\alpha$ (mAh/cm$^2$), and an average value of a thickness of the space layer, X ($\mu$m), satisfy $0.05 \leq \alpha/X \leq 0.2$.

2. The non-aqueous electrolyte secondary battery according to claim 1, wherein the lithium-containing transition metal oxide has a crystal structure belonging to a space group R-3m.

3. The non-aqueous electrolyte secondary battery according to claim 1, wherein an arithmetic average roughness Ra of a surface of the negative electrode current collector is 1.0 $\mu$m or more and 10.0 $\mu$m or less.

4. The non-aqueous electrolyte secondary battery according to claim 1, wherein the non-aqueous electrolyte contains ethylene carbonate and a non-aqueous solvent other than ethylene carbonate.

5. The non-aqueous electrolyte secondary battery according to claim 1, wherein the negative electrode current collector is copper foil.

* * * * *